(12) United States Patent
Maschauer et al.

(10) Patent No.: US 7,729,527 B2
(45) Date of Patent: Jun. 1, 2010

(54) METHOD FOR CORRECTING AN IMAGE DATA SET, AND METHOD FOR GENERATING AN IMAGE CORRECTED THEREBY

(75) Inventors: Stefan Maschauer, Zirndorf (DE); Dieter Ritter, Fürth (DE); Christian Schmidgunst, Straubing (DE)

(73) Assignee: Siemens Aktiengesellschaft, Munich (DE)

( * ) Notice: Subject to any disclaimer, the term of this patent is extended or adjusted under 35 U.S.C. 154(b) by 936 days.

(21) Appl. No.: 11/518,043

(22) Filed: Sep. 8, 2006

(65) Prior Publication Data

US 2007/0065038 A1    Mar. 22, 2007

(30) Foreign Application Priority Data

Sep. 9, 2005    (DE)    .................. 10 2005 043 048

(51) Int. Cl.
*G06K 9/00*    (2006.01)
(52) U.S. Cl. .................... 382/132; 382/274; 378/98.7
(58) Field of Classification Search ................ 382/128, 382/132, 274; 378/98.7, 98.9
See application file for complete search history.

(56) References Cited

U.S. PATENT DOCUMENTS

| | | | |
|---|---|---|---|
| 5,506,880 | A | 4/1996 | Scardino et al. ............ 378/98.2 |
| 6,529,622 | B1 * | 3/2003 | Pourjavid .................... 382/149 |
| 6,854,885 | B2 | 2/2005 | Wischmann et al. ........ 378/207 |
| 2005/0152615 | A1 * | 7/2005 | Hutchinson et al. ......... 382/274 |

FOREIGN PATENT DOCUMENTS

GB    2 314 227 A    12/1997

OTHER PUBLICATIONS

"Multiple Gain Ranging Readout Method to Extend the Dynamic Range of Amorphous Silicon Flat Panel Imagers," Roos et al, Medical Imaging 2004: Physics of Medical Imaging, Proceedings of SPIE, vol. 5368 (2004) pp. 139-149.

* cited by examiner

*Primary Examiner*—Andrew W Johns
(74) *Attorney, Agent, or Firm*—Schiff Hardin LLP (57) ABSTRACT

In a method for correction of an image data set that was acquired with a planar image detector using at least two calibration images that were acquired in a preliminary procedure, as well as a method for generation of an image from a raw image data set that was acquired with a planar image detector with a high-sensitivity dynamic range and with a low-sensitivity dynamic range and which is composed of two image data sets, of which one was acquired in the high-sensitivity dynamic range and the other was acquired in the low-sensitivity dynamic range, at least two calibration images are generated in each dynamic range in a preliminary process. These calibration images are used in a correction procedure for the correction of the individual image data sets, as well as in a combination procedure to merge the two corrected image data sets into one image. In the combination procedure the two image data sets are conformed to one another using a comparison of the calibration images of the high-sensitivity dynamic range with the calibration images of the low-sensitivity dynamic range. The adjusted, corrected image data sets are added with weighting in a second step.

18 Claims, 4 Drawing Sheets

METHOD FOR CORRECTING AN IMAGE DATA SET, AND METHOD FOR GENERATING AN IMAGE CORRECTED THEREBY

BACKGROUND OF THE INVENTION

1. Field of the Invention

The present invention concerns a method for correction of an image data set that has been acquired with a planar image detector, as well as a method for generation of an image from a raw image data set that was acquired with a planar image detector with two dynamic ranges.

2. Description of the Prior Art

An image that is acquired with an x-ray planar image detector without x-ray-absorbing subjects being located in the beam path (known as a light image) does not exhibit a homogeneous grayscale value distribution but instead shows a characteristic brightness curve. This is due to different causes that are based on specific properties of the detector pixels as well as curves based on the specific properties of the x-ray radiation generated by an x-ray radiator.

Even without exposure, every detector pixel also produces a specific dark current that is primarily temperature-dependent. Furthermore, each detector pixel exhibits a specific sensitivity such that different detector pixels supply different current values even given uniform radiation of x-rays. This specific sensitivity can be further influenced by the subsequent electronics with which the detector pixel is read.

In addition to the properties of the detector pixels, a further reason for the non-homogeneous grayscale value distribution arises from the x-ray radiation emanating from the x-ray tube, the intensity of which depends on the exit angle of the x-ray radiation from the x-ray tube. A vignetting of the x-ray image occurs due to the cone shape of the x-ray radiation; and the intensity of the x-ray radiation decreases toward the image border due to the Heel effect.

All of these factors contribute to a light image exhibiting a characteristic grayscale value distribution. This characteristic grayscale value distribution is reflected in an image data set of a subject that has been acquired and can lead to significant quality limitations of the image data set.

It is therefore necessary it calibrate the planar image detector such that the non-uniform grayscale value distribution that depends on the specific properties of the respective detector pixels is compensated. The calibration so attained is used to correct the image intensity values in the image data set of a subject that was acquired.

U.S. Pat. No. 5,506,880 and the corresponding DE 195 45 663 A1 disclose an x-ray system and a method with which radiographic real-time images (RTR images or "real time radiographic images") can be corrected for inhomogeneities of the x-rays. Calibration samples are used for this purpose in order to measure a field of attenuation information for the various calibration samples.

DE 101 49 404 A1 discloses a method for correction of different transduction characteristics in the processing of the signals from image sensors arranged distributed in a plane, as well as an x-ray detector that can execute such a method.

GB 2 314 227 A likewise describes a method for calibration of a pixel-based imaging apparatus for consideration of non-linear response properties of a pixel element and/or differences between pixel elements.

A method for calibration of a planar image detector with two different dynamic ranges is described in the publication by Roos et al., "Multiple-gain-ranging readout method to extend the dynamic range of amorphous silicon flat-panel imagers", Proc. SPIE Vol. 5368, pages 139 through 149, Medical Imaging 2004. Such planar image detectors typically have a high-sensitivity dynamic range and a low-sensitivity dynamic range. The high-sensitivity dynamic range supplies usable signals even at lower energy of the incident radiation, but is rapidly saturated with increasing incident radiation energy. The low-sensitivity dynamic range is saturated only at significantly higher radiation energy, however supplies noisy and therewith unusable signals at low radiation energy.

The dynamic ranges are individually used for an acquisition in what is known as "Fix Gain Mode". Depending on the incident radiation energy to be expected, the matching dynamic range can be used. For many applications in radiology the use of an individual dynamic range is sufficient in order to generate qualitatively high-grade images. There are applications, however, such as digital subtraction angiography and the application of what is known as the "cone beam technique" in computed tomography, in which a larger dynamic range of the planar image detector is necessary in order to deliver qualitatively high-grade exposures. In operation known as "dual gain mode", both of the aforementioned dynamic ranges are combined with one another in order to cover a larger dynamic range given an acquisition. Two image data sets that were each acquired in one dynamic range are combined in order to obtain an image of the acquired subject.

The calibration of such a planar image detector requires a certain technical effort. The method described in the article by Roos et al., Proc. SPIE Vol. 5368, pages 139 through 149, Medical Imaging 2004 essentially assumes that a calibration image is separately acquired for both dynamic ranges given a respective radiation dose suitable for a dynamic range. These two calibration images characterize the characteristic grayscale value distribution of the planar image detector for the dynamic range. The image data set of the corresponding dynamic range is then corrected using a calibration image. A further calibration image is also additionally acquired in the low-sensitivity dynamic range at the radiation dose at which the calibration image was acquired for the high-sensitivity dynamic range. The two dynamic ranges can be combined by comparison of these two calibration images since it is now known how the image intensity values of two image data sets that were acquired at the same radiation energy with the two dynamic ranges relate to one another.

When a calibration was implemented with the method described in Proc. SPIE Vol. 5368, pages 139 through 149, Medical Imaging 2004, however, for the most part vertically-arranged striped structures still remain in the image. These structures are all the more pronounced the more significantly that the radiation energy in the image acquisition deviates from the radiation energy that was acquired in calibration images. This is to be attributed to the fact that the detector pixels are incorporated into the planar image detector in columns and that the detector pixels are read out grouped in columns by the readout electronic. The detector pixels arranged in columns additionally often stem from different production charges and therefore additionally exhibit a slightly-different dependency of their sensitivity on the radiation energy. If the calibration was implemented at a single radiation dose and the image of this was acquired at a radiation energy range deviating from said single radiation dose, the calibration may be insufficient. This is reflected in detectable striped structures in the corrected image.

SUMMARY OF THE INVENTION

An object of the present invention is to provide a method that enables a correction of an image data set over a wide dynamic range and thus enables an improved generation of an image from a raw data set that was acquired with a planar, image detector with two different dynamic regions.

The above object is achieved in accordance with the invention by a method for correction of an image data set that was acquired with a planar image detector, the pixels of which each exhibit a specific image intensity value, wherein in a preliminary procedure, at least two calibration images are generated in which the planar image detector is exposed with respectively different radiation doses differing from zero, so the intensity values of the individual pixels and a global intensity average of all pixels are each known from the calibration images, and in an image correction procedure, the image intensity values of the pixels of the image data set are each corrected with a correction factor, and for calculation of the correction value given a specific pixel at least one numerical value is used that is computed for one of the calibration images and that is the quotient from the global intensity average of the calibration image and from the intensity of the corresponding pixel of the calibration image, and wherein the numerical values used are added with weighting in the correction factor.

In this method the planar image detector is calibrated not only at a specific radiation dose but rather with at least two different radiation doses, such that the dynamic range can be covered between than given a single-point calibration. Approximately 30 different radiation doses are used in order to calibrate the entire dynamic range of the planar image detector in a closed-mesh manner. Due to the coverage of the entire dynamic range, the sensitivity of each detector pixel is known at various radiation doses.

The different radiation doses are generated by a change of the tube amperage given a fixed tube voltage. The different calibration images have thus been acquired at a fixed tube voltage with which the image data set to be corrected was also acquired. The constancy of the tube voltage is necessary since, in the method, effects (such as, for example, the Heel effect) are also compensated, the occurrence of which is significantly influenced by the tube voltage and not by the tube amperage.

In order to compensate the different sensitivities of the individual detector pixels, the quotient from the global intensity average of a calibration image and from the intensity of the corresponding pixel of the calibration image is associated with each detector pixel. This numerical value correlates the sensitivity of an individual pixel with the average sensitivity of all pixels at a specific radiation dose. Using these numerical values that compensate the specific sensitivity of a detector pixel at the various radiation doses, a correction factor is computed that is necessary for the correction of the image intensity value of the pixel.

A dark image of the image data set that was generated contemporaneously with the image data set is advantageously subtracted between the preliminary process and the image correction process, before application of the image correction process. The image given which the planar image detector was read out without exposure is designated as a dark image. A detector pixel typically delivers a certain signal even without exposure, which signal is primarily ascribed to a temperature-dependent dark current. The interfering contribution of the temperature-dependent dark current can thus be removed via the subtraction of the dark image from the image data set. For this the dark image must be acquired contemporaneously with the image data set, typically five to ten minutes prior, since in this time frame the environmental conditions of the planar image detector (such as the temperature or the natural radiation) remain constant in good approximation. In the event that the planar image detector was in operation shortly before acquisition of the image or of the dark image, the time interval must under the circumstances be shortened since, due to the cooling of the planar image detector, the temperature of the same changes more significantly than given a planar image detector that is located in a rest state.

The dark image preferably is generated by averaging of a dark image series for which the planar image detector is read out without radiation. By this averaging statistical fluctuations that always result given the readout of the planar image detector without radiation can be compensated. In practice it has been shown that a dark image series with approximately 50 individual images represents a good compromise between precision, time and computational outlay.

When the image intensity value of a specific pixel is exactly as large as the intensity value of the corresponding pixel in one of the calibration images, the correction factor of the pixel can easily be calculated using the quotients from the global intensity average of a calibration image and from the intensity value of the corresponding pixel of the calibration image. For the case that the image intensity value of the pixel is not precisely met by the intensity value of a calibration image, those calibration images in which the intensity values of the corresponding pixel lies near to the image intensity value of the pixel are used for determination of the correction factor.

In a preferred embodiment of the method, either one or two numerical values are used for determination of the correction factor at a specific pixel with a specific image intensity value, the numerical value being the quotient from the global intensity average of a specific calibration image and from the intensity value of the corresponding pixel of the same calibration image. In the event that the image intensity value of the pixel is smaller than the intensity values of the corresponding pixels in all calibration images, a numerical value is used, and in fact that numerical value that is computed on the calibration image with the lowest radiation dose. The method proceeds in an analogous manner when the image intensity value of the pixel is greater than the intensity values of the corresponding pixels in all calibration images. If there are two calibration images whose intensity values of the corresponding pixels bound the image intensity value of the pixel, the two numerical values are used that are computed on both of these calibration images. With this method those calibration images in which the intensity values of the corresponding pixels are closest to the image intensity value of the pixel are selected for the determination of the correction factor.

For the case that there are two calibration images wherein the intensity values of the corresponding pixels bound the image intensity value of the pixel, it is advantageous to form the correction factor by a linear weighting of the two numerical values computed from the two calibration images. For this purpose each of the two numerical values is multiplied with an absolute magnitude of a quotient from a numerator and a denominator, whereby the numerator of the quotient being the difference of the image intensity value of the pixel and the intensity of the corresponding pixel in the calibration image, and the denominator of the quotient is a further difference of the intensities of the corresponding pixel of both calibration images. The two products are subsequently added.

By this method the correction factor given a specific pixel is also determined for image intensity values that are not met by precisely one calibration image. The determination of the correction factor using the described linear weighting of two calibration images is, however, only one possibility to determine the combination factor. Other forms of the weighting of (not necessarily) two calibration images can likewise be used when it is appropriate for the result of the image correction.

In a simple embodiment that is particularly suitable for implementation with a computer, the correction of the image data set is implemented with the following method steps:

The n calibration images are initially sorted in ascending order according to their global intensity average and indexed with a first index j; whereby n indicates the number of the calibration images and the index j runs from 1 to n; and whereby given a j-th calibration image the global intensity average is designated with $gm_j$ and the intensity value of an i-th pixel is designated with $g_{i,j}$.

Furthermore, the correction factor $f_i$ of the i-th pixel with an image intensity value $I_i$ of the image data set is determined according to the following algorithm:

In a first step a second index $k_i$ is determined according to the following correlation:

$k_i = n+1$ in the event that $I_i > g_{j,i} \forall j=1 \ldots n$ or $k_i = \min\{j, j=1 \ldots n | I_i \leq g_{j,i}\}$ otherwise.

In a second step the correction factor $f_i$ is determined according to the following correlation:

$f_i = gm_1/g_{1,i}$ in the event that $k_i = 1$, $f_i = gm_n/g_{n,i}$ in the event that $k_i = n+1$ or $f_i = (1-\omega_i) \cdot gm_{k_i-1}/gm_{k_i-1,i} + \omega_i \cdot gm_{k_i}/gm_{k_i,i}$ otherwise, whereby $\omega_i$ is a first weighting factor and has the value $\omega_i = (I_i - gm_{k_i-1,i})/(gm_{k_i,i} - gm_{k_i-1,i})$.

The image intensity value $I_i$ of the i-th pixel is thereupon multiplied with the correction factor $f_i$.

In a preferred embodiment, the calibration images determined in the preliminary process are respectively generated by averaging from a series of images in which the planar image detector is exposed with an identical radiation dose differing from zero. By this averaging (which is typically done over approximately 50 individual images), statistical fluctuations that result in the acquisition of a single image are compensated. Given the generation of calibration images it is advantageous that a further dark image generated contemporaneously is subtracted in each image of the series before the averaging of the series. The interfering and variable portion that results from the dark current (which is primarily dependent on the environmental conditions) is thereby eliminated in the calibration images. Here as well the dark image is generated by averaging of a dark image series.

The above object also is achieved in accordance with the invention by a method for generation of an image from a raw image data set that was acquired with a planar image detector with a high-sensitivity dynamic range and with a low-sensitivity dynamic range and that is composed of two image data sets, of which one was acquired in the high-sensitivity dynamic range and the other was acquired in the low-sensitivity dynamic range, wherein in a preliminary procedure, at least two calibration images are generated for each of the two dynamic ranges, wherein in each of the two dynamic ranges the planar image detector is exposed with at least two respectively different radiation doses differing from zero; and whereby the intensity values of the individual pixels and a global intensity average of all pixels are known from the calibration images.

In an image correction procedure, each of the two image data sets is corrected in order to respectively attain a corrected image data set. The correction of one of the two image data sets is implemented using those calibration images that have been generated in the same dynamic range with which the image data set was also acquired.

In a combination procedure, the two corrected image data sets are merged into one image by: in a first step, the image intensity values of the pixels of both corrected image data sets are conformed to one another using a comparison of the calibration images of the high-sensitivity range with the calibration images of the low-sensitivity range, and in a second step, the conformed, corrected image data sets are added with weighting.

Using this method for generation of an image with a planar image detector with two dynamic ranges, the calibration images are thus used such that every single image data set is independently corrected, as well as such that both corrected image data sets (that correspond to a different dynamic range) are conformed to one another so that they can ultimately be merged into a single image. Approximately 30 respectively different calibration images are typically used that cover the entire dynamic range in a close-meshed manner.

In comparison to conventional single-point calibration methods, the inventive method has the advantage that the correction of the individual image data sets is more precise since different detector sensitivities are covered across the entire dynamic range. Moreover, the conformation of the two image data sets is executed significantly more precisely since the two dynamic ranges are set in relation to one another not only given a specific radiation dose; rather this relation is established at the different radiation doses covering the entire dynamic range. Overall through these measures an improved signal-noise ratio is achieved, in particular at low dose ranges. Among other things, this appears as a visible image quality improvement.

The image correction method described above is advantageously used for correction of both image data sets.

In a preferred embodiment of the method, the calibration images of the high-sensitivity dynamic range and the low-sensitivity dynamic range have respectively been generated given the same different radiation doses differing from zero. The two dynamic ranges can be correlated with one another in a simple manner. For example, the global intensity average of a calibration image of the high-sensitivity dynamic range and the global intensity average of the corresponding calibration image of the low-sensitivity dynamic range can be compared with one another. Using this comparison both image data sets can be conformed to one another such that they can be merged into a common image.

In the combination method, only one of the two image data sets is conformed to the other image data set. The computation outlay is thereby reduced. For this the image intensity values of the pixels of the one image data set are respectively multiplied with a combination factor. For calculation of such a combination factor at least one comparison quotient is used that is formed from the global intensity average of one of the calibration images of the one dynamic range and from the global intensity average of the of the corresponding calibration image of the other dynamic range. The sensitivities of the detector pixels in one dynamic range are correlated with the sensitivities of the other dynamic range via such a comparison quotient. Which two calibration images are used for the formation of the comparison quotient, and therewith for the calculation of the combination factor, depends on the image intensity values of both pixels that should be conformed to one another. The calibration images are used having pixels with a similar, comparable intensity.

In one embodiment of the method, for the adaptation of the two image data sets the image data set of the low-sensitivity dynamic range is conformed to that of the high-sensitivity dynamic range.

In a simple embodiment that is particularly suitable for the implementation in a computer, given a specific pixel (that is indicated in the following with the index i) a combination factor $kf_i$ is determined according to the following steps and according to the following correlations:
- in a first step the n calibration images (n . . . number of the calibration images) of the high-sensitivity dynamic range are sorted in ascending order according to their global intensity average and indexed with an index j (j= 1 . . . n); whereby the global intensity average is designated with $gm_j^{HD}$ given a j-th calibration image of the high-sensitivity dynamic range; and whereby a number r indicates the number of the calibration images of the high-sensitivity dynamic range given which no saturation has occurred;
- in a second step, the corresponding n calibration images (n . . . number of the calibration images) of the low-sensitivity dynamic range are correspondingly indexed, whereby the global intensity average in the j-th calibration image of the low-sensitivity dynamic range is designated with $gm_j^{ND}$;
- in a third step, the combination factor $kf_i$ of an i-th pixel of the image data set of the low-sensitivity dynamic range with the image intensity value $I_i^{ND}$ is determined with the following sub-steps:
  - in a first sub-step, an index $I_i$ is determined according to the following correlation:

$I_i = n+1$ in the event that $I_i^{HD} > gm_j^{HD} \forall j=1 \ldots n$ or $I_i = \min\{j, j=1 \ldots n | I_i^{HD} > gm_j^{HD}\}$ otherwise, whereby $I_i^{HD}$ characterizes the image intensity value of the i-th pixel of the image data set of the high-sensitivity dynamic range;
  - in a second sub-step, the combination factor $kf_i$ is calculated according to the following correlation:

$kf_i = gm_1^{HD}/gm_1^{ND}$ in the event that $I_i=1$, $kf_i = gm_r^{HD}/gm_r^{ND}$ in the event that $I_i \geq r$ or $kf_i = (1-\tau_i) \cdot gm_{I_i-1}^{HD}/gm_{I_i-1}^{ND} + \tau_i \cdot gm_1^{HD}/gm_1^{ND}$ otherwise, wherein $\tau_i$ is a second weighting factor and has the value $\tau_1 = (I_i^{HD} - gm_{I_i-1}^{HD})/(gm_{I_i}^{HD} - gm_{I_i-1}^{HD})$.

When the image intensity value $I_i^{ND}$ of the i-th pixel of the image data set of the low-sensitivity dynamic range is multiplied with the combination factor $kf_i$, both i-th pixels of both data sets are conformed to one another and can be used to calculate the image intensity value of the i-th pixel in the ultimate image.

In another embodiment of the method, the adjusted image data set of the low-sensitivity dynamic range is merged with the image data set of the high-sensitivity dynamic range into a single image, and the following steps are executed:
- an upper intensity value limit $IG_o$ in the high-sensitivity dynamic range is initially determined below which the image data set of the high-sensitivity dynamic range exhibits no saturated image intensity values;
- furthermore, a lower intensity value limit $IG_u$ in the low-sensitivity dynamic range is determined above which the image data set of the low-sensitivity dynamic range exhibits image intensity values that clearly lie above the background noise, and a second lower intensity value limit in the high-sensitivity dynamic range $IG_u'$ is determined that corresponds to the lower intensity value limit $IG_u$ in the low-sensitivity dynamic range;
- the image intensity value of the i-th pixel $I_i$ of the image is thereupon calculated according to the following correlation:

$I_i = kf_i \cdot I_i^{ND}$ in the event that $I_i^{HD} > IG_o$, $I_i = I_i^{HD}$ in the event that $I_i^{ND} < IG_u$, $I_i = (1-\sigma_i) \cdot I_i^{HD} + \sigma_i \cdot kf_i \cdot I_i^{ND}$ otherwise, wherein $\sigma_i$ is a third weighting factor and has the value $\sigma_i = (I_i^{HD} - IG_u')/(IG_o - IG_u')$, wherein $I_i^{HD}$ is the image intensity value of the i-th pixel of the image data set of the high-sensitivity dynamic range, and whereby $I_i^{ND}$ is the image intensity value of the i-th pixel of the image data set of the low-sensitivity dynamic range.

The two image data sets are merged into a common image with this method dependent on the image intensity values of the two adjusted image data sets. In the event that the image intensity values are so high that the image data set of the high-sensitivity dynamic range is already saturated (see the directional effect of the upper intensity value limit $IG_o$), only the image intensity values of the low-sensitivity dynamic range are used for the image. Contrarily, only the image intensity values of the high-sensitivity dynamic range are used for the images when the image intensity values of the image data set of the low-sensitivity dynamic range are so low that the background noise preponderates in a disruptive manner (see the directional effect of the lower intensity value limit $IG_u$). In the overlap range in which both the image data set of the low-sensitivity dynamic range and that of the high-sensitivity dynamic range supply reliable image intensity values, both image data sets are used with linear weighting. For example, the closer that an image intensity value of the high-sensitivity dynamic range lies to the upper intensity value limit, the more strongly that the image intensity value of the low-sensitivity image data set is weighted.

Since the third weighting factor $\sigma_i$ is calculated using the image intensity value $I_i^{HD}$ of the i-th pixel of the high-sensitivity dynamic range, in addition to the upper intensity value limit $IG_o$ a further lower intensity value limit $IG_u'$ is introduced that is likewise defined in the high-sensitivity dynamic range and that largely corresponds to the lower value limit $IG_u$ that, is defined in the low-sensitivity dynamic range. The third weighting factor is determined using the image intensity value $I_i^{HD}$, by comparing $I_i^{HD}$ to the two intensity value limits $IG_o$ and $IG_u'$.

In a further embodiment, using at least one of the calibration images determined in the preliminary process a defective pixel map is generated in which detector pixels are marked whose signals are incorrect. The corresponding pixels are characterized in one of the two image data sets using the defective pixel map. A detector pixel is thereby marked as flawed when the intensity value of the corresponding pixel deviates too significantly from the global intensity average in a calibration image. In the event that a series of images is used for generation of a calibration image or of a dark image, a too-high noise or values of a detector pixel deviating too strongly from the average within this series likewise indicate a defect. These detector pixels are likewise added to the defective pixel map.

When a planar image detector with two dynamic ranges is used in the generation of the image, a defective pixel in one dynamic range can be compensated by the corresponding pixel in the other dynamic range when the corresponding pixel of the other dynamic range is intact and its image intensity value lies within the reliable range. This would be the case, for example, in the event that the corresponding pixel does not lie above the upper intensity value limit in the high-sensitivity dynamic range or in the event that the corresponding pixel does not lie below the lower intensity value limit in the low-sensitivity dynamic range. In the event that, given one pixel, the corresponding pixel lies above the upper intensity value limit in the high-sensitivity dynamic range and the corresponding pixel lies below the lower intensity value limit in the low-sensitivity dynamic range, the pixel is likewise marked as defective. A pixel characterized as defective in the image can be filled in via various interpolation methods.

DESCRIPTION OF THE PREFERRED EMBODIMENTS

Figure 1:
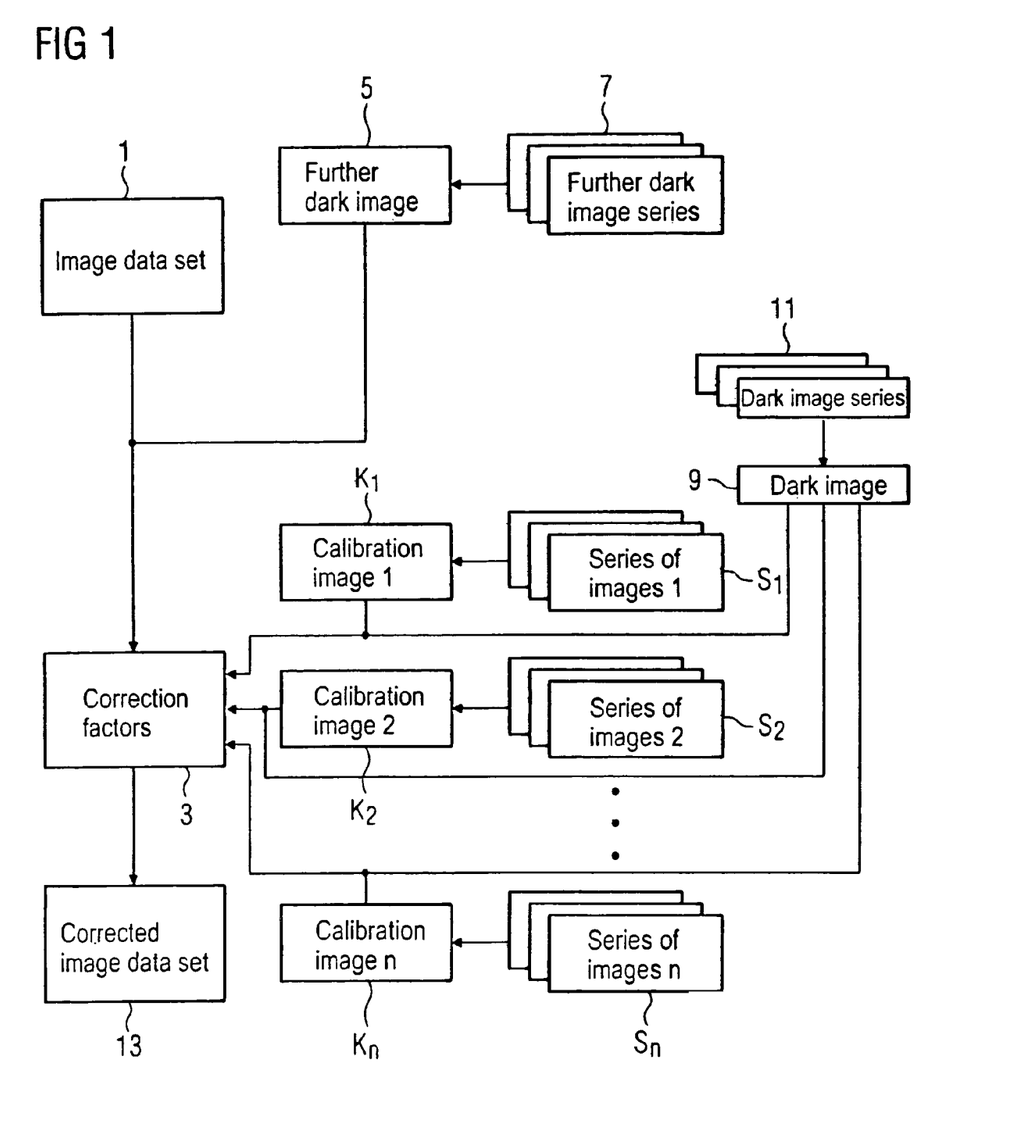
FIG. 1 is a block diagram for the method for correction of an image data set that was acquired with a planar image detector.

A method for correction of an image data set 1 that was acquired with a planar image detector is explained in FIG. 1 using a block diagram. In an actual image correction method the pixels of the image data set 1 (in which a subject was acquired with the planar image detector and the pixels of which exhibit different image intensity values) are multiplied with respectively one correction factor 3 in order to obtain a corrected image data set 13. In this correction method the different sensitivities of the individual detector pixels are compensated.

The correction factors 3 necessary for this are determined with the aid of a plurality of calibration images $K_1, K_2 \ldots K_n$ that were acquired in a preliminary process. The calibration images $K_1, K_2 \ldots K_n$ are thereby what are known as light images, i.e. images in which the planar image detector is exposed without a subject in the beam path absorbing x-rays. The different calibration images $K_1, K_2 \ldots K_n$ have thereby been acquired with different radiation doses and reflect the sensitivity of the detector pixels at the different radiation doses. When the different radiation doses are distributed across the entire dynamic range of the planar image detector, a sensitivity profile is thereby gained for each detector pixel that designates the sensitivity of the detector pixels in the entire dynamic range of the planar image detector. Approximately 30 calibration images sufficiently cover the dynamic range of the planar image detector in a closed-mesh manner. Depending on the planar image detector used and quality of the detector pixels, however, more or fewer calibration images (for example 100 or even only 2) can be necessary in order to satisfactorily implement the image correction method. The distribution of the radiation doses must not be equidistant. The more significantly the sensitivity curve of the detector pixels deviates from a linear profile, the more closely the steps of the radiation doses are selected.

After a certain time duration (typically after a couple months) it is advantageous to recreate the calibration gained by the preliminary process since in this time span the sensitivity of a detector pixel can noticeably change in the course of the usage of the planar image detector. In this time span defective pixels (detector pixels that have become defective) can also accrue that can in turn be detected given the generation of the calibration images.

Each of the calibration images $K_1, K_2 \ldots K_n$ is thereby advantageously created from a series of images $S_1, S_2 \ldots S_n$ in which the planar image detector is exposed with the same radiation dose differing from zero. The individual images of a series of images $S_1, S_2 \ldots S_n$ are thereby averaged. Statistical fluctuations that result upon readout of the planar image detector can be minimized. It has proven to be advantageous for each of the series of images $S_1, S_2 \ldots S_n$ to be composed of approximately 50 individual images. This number represents a good compromise between precision of the averaging and time expenditure to generate the individual images.

A dark image 9 is additionally subtracted in each of the calibration images $K_1, K_2 \ldots K_n$. The dark image 9 is characterized in that the planar image detector is read out without exposure. The detector pixels typically supply a slight current even without exposure, which current is primarily dependent on the environmental conditions such as the temperature or the natural radiation. This current portion is present both in dark images and in light images. This unwanted signal portion of the detector pixels is eliminated via the subtraction of the dark image 9. The dark image 9 is generated contemporaneously with the calibration images $K_1, K_2 \ldots K_n$, i.e. without significant change of the environmental conditions. For the purpose of the elimination of statistical fluctuations, here as well it is advantageous when the dark image 9 is generated via averaging from a dark image series 11 that typically includes approximately 50 individual images.

For the aforementioned reasons, given the calibration images a further dark image 5 generated contemporaneously with the image data set 1 is likewise subtracted from the image data set 1 before the application of the image correction method to the image data set 1. As with the dark image 9 that was subtracted from the calibration images $K_1, K_2 \ldots K_n$, the further dark image 5 is generated from a further dark image series 7 in order to compensate statistical fluctuations in the readout of the dark image.

The calibration images $K_1, K_2 \ldots K_n$ are drawn upon in order to calculate a correction factor 3 with which the image intensity value of a pixel is corrected. For this, given each calibration image $K_1, K_2 \ldots K_n$ a quotient is formed from the global intensity average and the intensity value of the corresponding pixel. Such a quotient conforms the sensitivity of a single detector pixel to the average sensitivity of the entirety of the detector pixels, and in fact at the radiation dose at which the calibration image was acquired.

Which quotients of which calibration image $K_1, K_2 \ldots K_n$ are used for the correction of the image intensity value of the pixel depends on the image intensity value of the pixel. Those calibration images $K_1, K_2 \ldots K_n$ that were acquired at a radiation dose similar to the image intensity value of the pixel are advantageously used.

If the image intensity value is so high that it is greater than all intensity values of the corresponding pixel in the calibration images $K_1, K_2 \ldots K_n$, the quotient of that calibration image $K_n$ that was acquired at the highest radiation dose is used. Contrarily, if the image intensity value is so low that it is smaller than all intensity values of the corresponding pixel in the calibration images $K_1, K_2 \ldots K_n$, the quotient of that calibration image $K_n$ that was acquired at the lowest radiation dose is used.

If the image intensity value of the pixel lies in a middle range such that it provides both a portion of the calibration images of that calibration images $K_1, K_2 \ldots K_n$ in which the intensity values of the corresponding pixel are greater than the image intensity value and a different portion of the calibration images $K_1, K_2 \ldots K_n$ in which the intensity values are smaller, the quotients of both adjoining calibration images are used: this is on the one hand the calibration image in which the intensity value of the corresponding pixel is greatest, however still lies below the image intensity value of the pixel, and on the other hand the calibration image in which the intensity value of the corresponding pixel is smallest, however still lies above the image intensity value of the pixel. Both quotients are advantageously used with linear weighting in the sense that one of the quotients is more strongly weighted the closer that the image intensity value lies to the intensity value of the pixel of the corresponding calibration image.

The quotients given the calibration images $K_1, K_2 \ldots K_n$, which are respectively formed from the global intensity average and the intensity value of a pixel, thereby represent correction factors 3 given the n discrete radiation doses. The linear weighting (described above) of only two quotients is thereby only one possibility in order to interpolate the correction factor 3 given an arbitrary radiation dose. It can also be appropriate to use other types of weightings of the quotients or of interpolation methods in order to calculate a correction factor 3 given an arbitrary radiation dose. The interpolation and the weighting methods are thereby respectively tuned to the profile of the sensitivity curve and to the distribution of the n calibration images.

Figure 2:
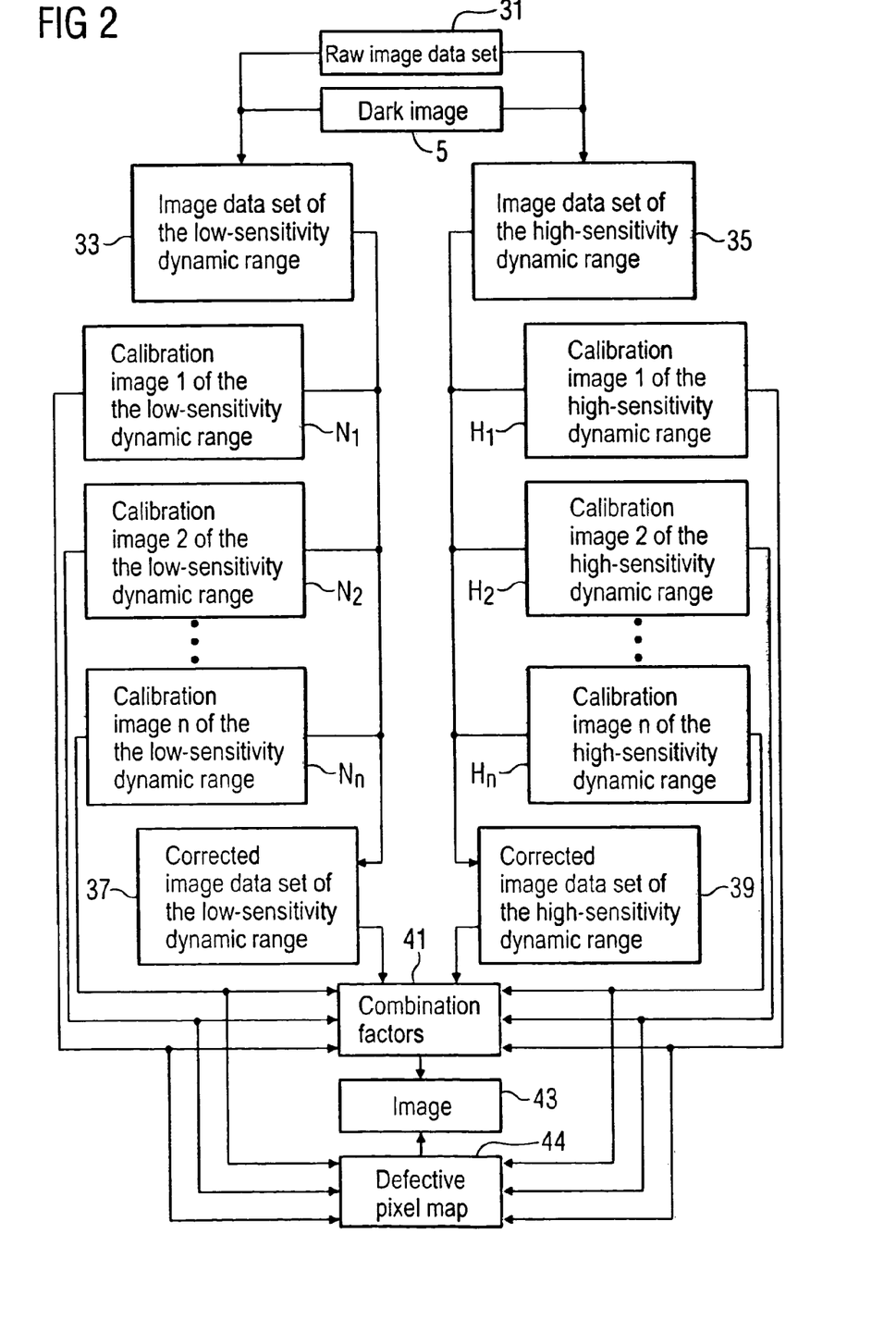
FIG. 2 is a block diagram for the method for generation of an image from a raw image data set that was acquired with a planar image detector with two dynamic ranges.

A method for generation of an image 43 from a raw image data set 31 that was acquired with a planar image detector with two dynamic ranges is explained in FIG. 2 using a block diagram. When a planar image detector is operated in what is known as "dual gain mode", the raw image data set 31 comprises two image data sets, of which the first image data set 33 was acquired in the low-sensitivity dynamic range and the second image data set 35 was acquired in the high-sensitivity dynamic range.

In a first step each of the two image data sets 33, 35 is independently corrected in order to compensate the different sensitivities of the individual detector pixels. This image correction method is implemented for the first image data set 33 with the aid of a first series of calibration images $N_1, N_2 \ldots N_n$ that were acquired in the low-sensitivity dynamic range and cover this dynamic range of the planar image detector in a close-meshed manner. The image correction method advantageously corresponds to the method already described, however is not limited to this. The image correction method for the second image data set 35 is likewise implemented with a series of calibration images $H_1, H_2 \ldots H_n$ that were acquired in the high-sensitivity dynamic range.

For the aforementioned reasons, here as well as dark image 5 that was acquired in essentially the same environmental conditions as the raw image data set is subtracted in both image data sets 33, 35 before application of the image correction method. Such dark images have also been applied in the generation of both series of calibration images $H_1, H_2 \ldots H_n; N_1, N_2 \ldots N_n$. For clarity they have not been drawn in FIG. 2.

In a second step, both series of calibration images $H_1, H_2 \ldots H_n; N_1, N_2 \ldots N_n$ are furthermore used to set the sensitivity of a detector pixel in the low-sensitivity dynamic range in relation to the sensitivity of the same detector pixel in the high-sensitivity dynamic range. Using this comparison of the sensitivities of the detector pixels of both dynamic ranges, combination factors 41 can be calculated using which the corrected first image data set 37 and the corrected second image data set 39 are merged into one image 43.

Both series of calibration images $H_1, H_2 \ldots H_n; N_1, N_2 \ldots N_n$ are furthermore used to generate a defective pixel map 44. The detector pixels whose signals are incorrect are thereby marked in the defective pixel map 44. Using the defective pixel map 44 the corresponding pixels are identified in one of the two image data sets 33, 35 or, respectively, 37, 39 and ultimately also in the image 43. A detector pixel is thereby marked as defective when the intensity value of the corresponding pixel in the calibration image $H_1, H_2 \ldots H_n; N_1, N_2 \ldots N_n$ deviates too significantly from the global intensity average. In the event that a series of images $S_1, S_2 \ldots S_n$ is used for generation of a calibration image $K_1, K_2 \ldots K_n; H_1, H_2 \ldots H_n; N_1, N_2 \ldots N_n$, a too-high noise or values of a detector pixel deviating too significantly from the average value within this series likewise indicates a defect. A noise in a dark image series 7, 9 that is too high can also indicate a defective pixel. These detector pixels are likewise added to the defective pixel map 44. A defective pixel designated in the image 43 can be filled in via various interpolation methods that are known to the average person skilled in the art.

When a planar image detector with two dynamic ranges is used, given the generation of the image 43 a defective pixel in one dynamic range is compensated by the corresponding pixel in the other dynamic range when the corresponding pixel of the other dynamic range is intact and its image intensity value lies within a range that is reliable for this dynamic range.

Figure 3:
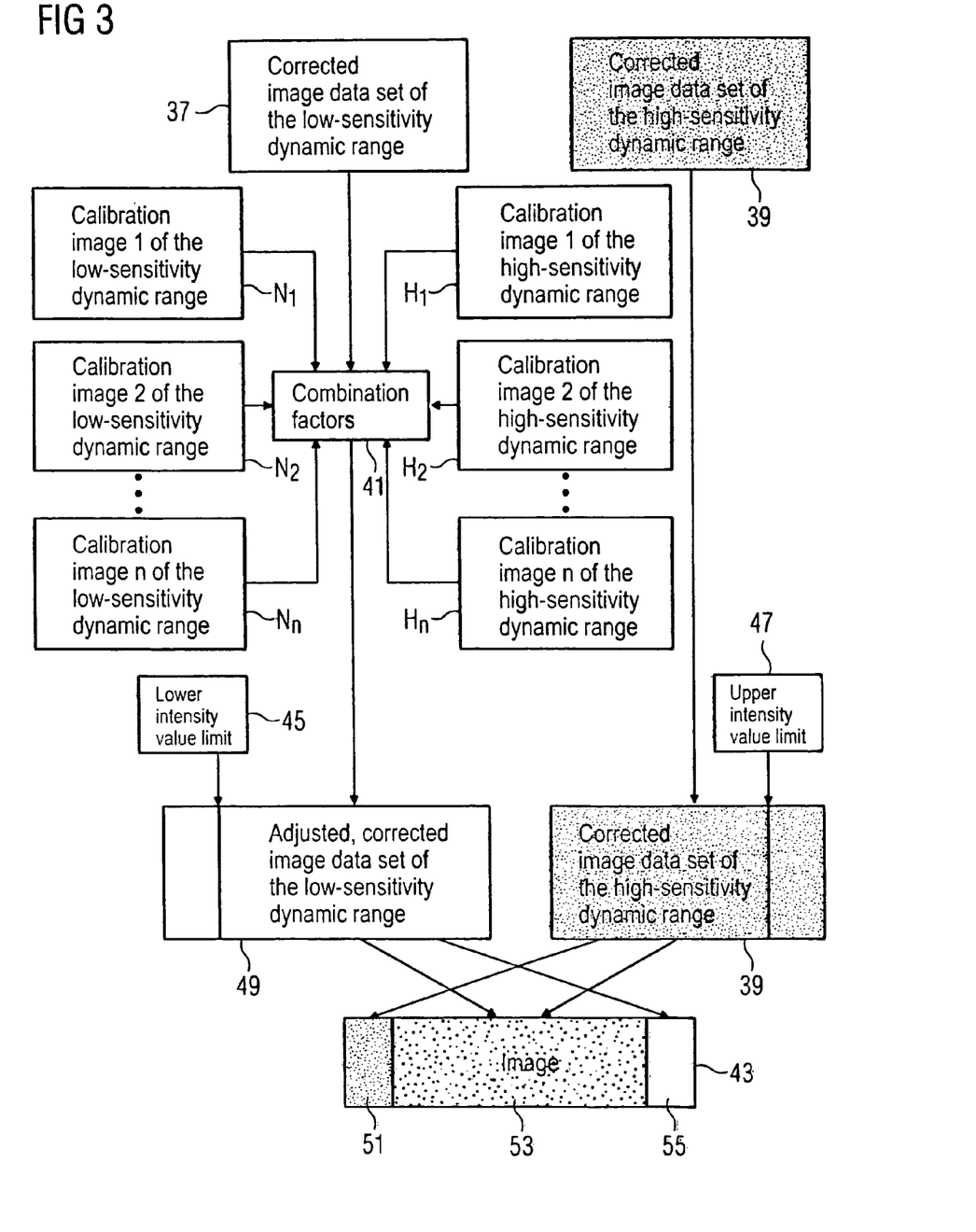
FIG. 3 is a block diagram for the combination method in which two corrected image data sets are combined into one image.

An embodiment of the combination method using which the corrected first image data set 37 and the corrected second image data set 39 are combined into an image 43 is described in FIG. 3.

In a first step the corrected image data set 37 of the low-sensitivity dynamic range is conformed to the corrected image data set 39 of the high-sensitivity dynamic range. Both series of calibration images $H_1, H_2 \ldots H_n; N_1, N_2 \ldots N_n$ of the low-sensitivity dynamic range and of the high-sensitivity dynamic range are used for this. Via formation of a comparison quotient from the global intensity average in a calibration image $H_1, H_2 \ldots H_n$ of the high-sensitivity dynamic range and from the global intensity average of the corresponding calibration image $N_1, N_2 \ldots N_n$ of the low-sensitivity dynamic range, a factor is obtained with which the image intensity value of a pixel of the low-sensitivity dynamic range can be multiplied. The image data set 37 of the low-sensitivity dynamic range is thereby conformed to the high-sensitivity dynamic range.

Which calibration image pair or which calibration image pairs $H_1, N_1; H_2, N_2; \ldots H_n, N_n$ is/are used for the formation of the comparison quotient depends on the image intensity value of the pixel. Similar to the determination of the correction factors 3 described above, the combination factor 41 is calculated with the aid of the one calibration image pair or, respectively, both calibration image pairs whose intensity values of the corresponding pixels lie near the image intensity value. A precise description of the method mentioned here using mathematical correlations and formulae is found in patent claim 15.

In a second step, both corrected and adjusted image data sets 39, 49 are merged into a common image 43. Both image data sets are hereby added with weighting. How strongly a pixel of each of the two image data sets 39, 49 is weighted depends on the image intensity values of the corresponding pixels in each of the two image data sets 39, 49.

In the event that the image intensity values of the pixel are so high that the pixel in the image data set 39 of the high-sensitivity dynamic range already lies in the saturation range 55, only the image intensity value of the low-sensitivity dynamic range is used for the image pixel. In the event that the image intensity values of the pixel are so low that the pixel lies in the range of the background noise 51 in the image data set 49 of the low-sensitivity dynamic range, i.e. in the event that the image intensity value is so low that the background noise disruptively interferes with it, only the image intensity value of the high-sensitivity dynamic range is used for the image pixel. Both of these borderline cases can be defined by the introduction of an upper intensity value limit 45 or lower intensity value limit 47. The upper intensity value limit 45 is thereby defined in the high-sensitivity dynamic range, the lower intensity value limit 47 in the low-sensitivity dynamic range.

In the overlap range 53 in which both the image data set 49 of the low-sensitivity dynamic range and the image data set 39 of the high-sensitivity dynamic range supply reliable image intensity values, both image data sets 39, 49 are used with linear weighting. For example, the closer that an image intensity value of the high-sensitivity image data set 39 likes to the upper intensity value limit 47, the more strongly that the image intensity value of the low-sensitivity image data set 49 is weighted. A description of the method illustrated here using mathematical correlations and formulae is found in patent claim 16.

Figure 4:
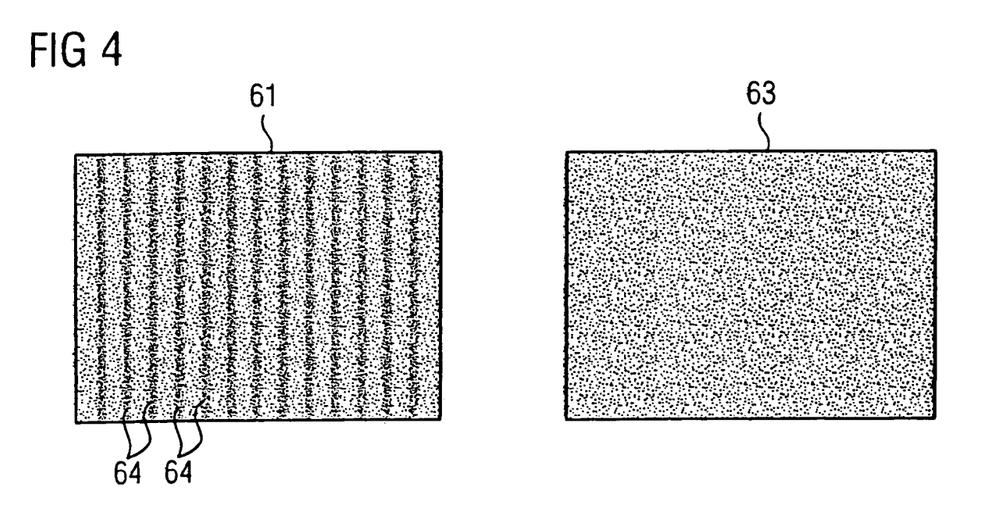
FIG. 4 shows two images corrected in different ways, the images having been acquire with a planar image detector with two dynamic ranges.

FIG. 4 shows two light images that were acquired with a planar image detector with two dynamic ranges. Of the two light images, one was generated with a conventional method while the other was generated with the inventive method shown here.

In the first image 61, the image was generated from the acquired raw image data set 31 according the previously-used single-point calibration method (see Proc. SPIE Vol. 5368, pages 139 through 149, Medical Imaging 2004). Striped structures 64 are still clearly recognizable. Correlated to this is a readout electronic arranged in columns, which readout electronic slightly influences the sensitivity of the individual detector pixels. By a calibration of both dynamic ranges are respectively a single radiation dose, the different sensitivity of the individual detector pixels primarily attracts attention when the image (as shown here) was acquired with a radiation dose deviating from the calibration dose.

The inventive method was applied in the second image 63. By this multi-point calibration method, the striped structures 64 present in image 61 are notably reduced since now the different sensitivities of the individual detector pixels have been taken into account in various radiation doses covering the entire dynamic range in a close-meshed manner. The image quality noticeably improves and in particular enables applications requiring high-quality images with a large dynamic range, such as digital subtraction angiography or the application of what is known as the "cone beam technique" in computed tomography.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for correction of an image data set acquired with a planar image detector and being composed of pixels each exhibiting a specific image intensity value, comprising the steps of:
    in a preliminary procedure generating at least two calibration images in which the planar image detector is exposed with respectively different radiation doses differing from zero, with the intensity values of the individual pixels and a global intensity average of all pixels being known from the calibration images; and
    in an image correction procedure, correcting each of the image intensity values of the pixels of the image data set with a correction factor, and calculating the correction factor for each pixel using at least one numerical value that is computed for one of the calibration images and that is the quotient of the global intensity average of the calibration image and the intensity of the corresponding pixel of the calibration image, and adding the numerical values used for each pixel with weighting in the correction factor.

2. A method as claimed in claim 1 comprising generating said at least two calibration images with respectively different radiation doses, by changing an amperage in an x-ray tube given a fixed voltage in said x-ray tube.

3. A method as claimed in claim 1 comprising generating a dark image contemporaneously with the image data set and subtracting said dark image from the image data set between the preliminary procedure and the image correction procedure, before executing the image correction procedure.

4. A method as claimed in claim 3 comprising generating the dark image by averaging a plurality of dark images in a dark image series.

5. A method as claimed in claim 1 comprising determining the correction factor for a specific pixel with a specific image intensity value by:
    using two numerical values when at least one calibration image exists in which the intensity of the pixel lies below the image intensity value; and when at least one further calibration image exists in which the intensity of the corresponding pixel lies above the image intensity value, and calculating a first of said two numerical values for a calibration image in which the intensity value of the corresponding pixel is greatest, but still lies below the image intensity value; and calculating a second of said two numerical values for a calibration image in which the intensity value of the corresponding pixel is smallest, but still lies above the image intensity value; and
    using a single numerical value when the image intensity value of the pixel is greater or smaller than the intensity values of the corresponding pixels in all calibration images, and calculating the numerical value from calibration image in which the intensity of the corresponding pixel is greatest or smallest.

6. A method as claimed in claim 5 comprising, when using said two numerical values for determination of the correction factor for a specific pixel, adding said first and second numerical values with linear weighting by, before the addition, multiplying each of the first and second numerical values with an absolute magnitude of a quotient having a numerator that is a difference of the image intensity value of the pixel being corrected and the intensity of the corresponding pixel in the calibration image, and having a denominator that is a further difference of the intensities of the corresponding pixel of both calibration images.

7. A method as claimed in claim 1 comprising:
    sorting the n calibration images in ascending order according to their global intensity average and indexed with a first index j; wherein n indicates the number of the calibration images and the index j runs from 1 to n; and wherein for a j-th calibration image, the global intensity average is $gm_j$ and the intensity value of an i-th pixel is $g_{j,i}$;
    determining the correction factor $f_i$ of the i-th pixel of the image data set with an image intensity value $I_i$ according to an algorithm wherein, in a first step, a second index $k_i$ is determined according to:

$k_i = n+1$ in the event that $I_i > g_{j,i} \forall j = 1 \ldots n$ and $k_i = \min\{j, j = 1 \ldots n | I_i \leq g_{j,i}\}$ otherwise, and in a second step the correction factor $f_i$ is determined according to the following correlation:

$f_i = gm_1/g_{1,i}$ if $k_i = 1$, $f_i = gm_n/g_{n,i}$ if $k_i = n+1$, and $f_i = (1-\omega_i) \cdot gm_{k_i-1}/gm_{k_i-1,i} + \omega_i \cdot gm_{k_i}/gm_{k_i,i}$ otherwise, whereby $\omega_i$ is a first weighting factor and has a value $\omega_i = (I_i - gm_{k_i-1,i})/(gm_{k_i,i} - gm_{k_i-1,i})$; and multiplying the image intensity value $I_i$ of the i-th pixel is thereupon multiplied with the correction factor $f_i$.

8. A method as claimed in claim 1 comprising generating each of the calibration images by averaging a plurality of images in a series of images in which the planar image detector is exposed with an identical non-zero radiation dose for generating each image in said series.

9. A method as claimed in claim 8 comprising generating a dark image contemporaneously with each image of the series and subtracting the dark image from each image of said series before the averaging the series.

10. A method as claimed in claim 9 comprising generating the dark image by averaging a plurality of dark images in a dark image series in which the planar image detector is read out without exposure thereof.

11. A method for generation of an image from a raw image data set acquired with a planar image detector having a high-sensitivity dynamic range and a low-sensitivity dynamic range, said raw image data set comprising a first image data set acquired in the high-sensitivity dynamic range and a second image data set acquired in the low-sensitivity dynamic range, comprising the steps of:

in a preliminary procedure generating at least two calibration images for each of the two dynamic ranges by, in each of the two dynamic ranges, exposing the planar image detector with at least two different non-zero radiation doses, with the intensity values of the individual pixels and a global intensity average of all pixels being known from the calibration images;

in an image correction procedure, correcting each of the two image data sets to attain respective corrected image data sets, with one of the two image data sets being corrected using only calibration images that were generated in the same dynamic range with which the one of the two image data sets was acquired;

in a combination procedure, merging the two corrected image data sets into one image by conforming the image intensity values of the pixels of both corrected image data sets to one another using a comparison of the calibration images of the high-sensitivity range with the calibration images of the low-sensitivity range, and then adding the conformed, corrected image data sets with weighting.

12. A method as claimed in claim 11 comprising correcting each of the two image data sets by:

in a preliminary procedure generating at least two calibration images in which the planar image detector is exposed with respectively different radiation doses differing from zero, with the intensity values of the individual pixels and a global intensity average of all pixels being known from the calibration images; and in an image correction procedure, correcting each of the image intensity values of the pixels of the image data set with a correction factor, and calculating the correction factor for each pixel at least one numerical value that is computed for one of the calibration images and that is the quotient of the global intensity average of the calibration image and the intensity of the corresponding pixel of the calibration image, and adding the numerical values used for each pixel with weighting in the correction factor.

13. A method as claimed in claim 11 comprising generating the calibration images of the high-sensitivity dynamic range and of the low-sensitivity dynamic range with the same different non-zero radiation doses.

14. A method as claimed in claim 13 comprising, in the combination procedure conforming one of the two corrected image data sets to the other corrected image data set by multiplying: the image intensity values of the pixels of the one corrected image data set multiplied with a combination factor, and calculating the combination factor for a specific pixel using at least one comparison quotient formed from a global intensity average of one of the calibration images of a first of the dynamic ranges and from a global intensity average of the of a corresponding calibration image of a second of the dynamic ranges.

15. A method as claimed in claim 13 comprising conforming the corrected image data set of the low-sensitivity dynamic range to the corrected image data set of the high-sensitivity dynamic range by multiplying the image intensity value of the pixels of the corrected image data set of the low-sensitivity dynamic range multiplied with a combination factor and for calculating the combination factor for a specific pixel using at least one comparison quotient formed from the global intensity average of one of the calibration images of the high-sensitivity dynamic range and from a global intensity average of the of the corresponding calibration image of the low-sensitivity dynamic range.

16. A method as claimed in claim 15 comprising, for a specific pixel of the image data set of the low-sensitivity dynamic range, determining the combination factor by:

sorting the n calibration images (n=number of the calibration images) of the high-sensitivity dynamic range in ascending order according to their global intensity average and indexed with an index j (j=1 ... n); wherein the global intensity average is $gm_j^{HD}$ for a j-th calibration image of the high-sensitivity dynamic range, and wherein r indicates a number of the calibration images of the high-sensitivity dynamic range for which no saturation has occurred;

indexing the corresponding n calibration images of the low-sensitivity dynamic range, wherein the global intensity average in the j-th calibration image of the low-sensitivity dynamic range is $gm_j^{HD}$; and determining the combination factor $kf_i$ for an i-th pixel of the corrected image data set of the low-sensitivity dynamic range with the image intensity value $I_i^{ND}$ in an algorithm, wherein, in a first sub-step, an index $I_i$ is determined according to:

$I_i = n+1$ if $I_i^{HD} > gm_j^{HD} \forall j = 1 \ldots n$ or $I_i = \min\{j, j = 1 \ldots n | I_i^{HD} > gm_j^{HD}\}$ otherwise, wherein $I_i^{HD}$ is the image intensity value of the i-th pixel of the corrected image data set of the high-sensitivity dynamic range, and in a second sub-step, the combination factor $kf_i$ is calculated according to:

$kf_i = gm_1^{HD}/gm_1^{ND}$ if $I_i=1$, $kf_i = gm_r^{HD}/gm_r^{ND}$ if $I_i \geq r$, and $kf_i = (1-\tau_i) \cdot gm_{l_i-1}^{HD}/gm_{l_i-1}^{ND} + \tau_i \cdot gm_{l_i}^{HD}/gm_{l_i}^{ND}$ otherwise, wherein $\tau_i$ is a second weighting factor and has the value $\tau_1 = (I_i^{HD} - gm_{l_i-1}^{HD})/(gm_{l_i}^{HD} - gm_{l_i-1}^{HD})$.

17. A method as claimed in claim 16 comprising:
determining an upper intensity value limit $IG_o$ below which the image data set of the high-sensitivity dynamic range exhibits no saturated image intensity values;
determining a first lower intensity value limit $IG_u$ above which the image data set of the low-sensitivity dynamic range exhibits image intensity values that lie substantially above the background noise, and determining a second lower intensity value limit $IG_u'$ in the high-sensitivity dynamic range that corresponds to the lower intensity value limit $IG_u$ in the low-sensitivity dynamic range; and
calculating the image intensity value of the i-th pixel $I_i$ of the image according to the following correlation:

$I_i = kf_i \cdot I_i^{ND}$ in the event that $I_i^{HD} > IG_o$, $I_i = I_i^{HD}$ in the event that $I_i^{ND} < IG_u$, and $I_i = (1-\sigma_i) \cdot I_i^{HD} + \sigma_i \cdot kf_i \cdot I_i^{ND}$ otherwise, wherein $\sigma_i$ is a third weighting factor and has the value $\sigma_i = (I_i^{HD} - IG_u')/(IG_o - IG_u')$, wherein $I_i^{HD}$ is the image intensity value of the i-th pixel of the corrected image data set of the high-sensitivity dynamic range, and whereby $I_i^{ND}$ is the image intensity value of the i-th pixel of the corrected image data set of the low-sensitivity dynamic range.

18. A method as claimed in claim 11 comprising generating a defective pixel map from at least one of the calibration images determined in the preliminary procedure, said defective pixel map marking the pixels having incorrect pixels; and identifying corresponding pixels in the one image generated by merging in the combination procedure using the defective pixel map.

* * * * *